US012626323B2

(12) United States Patent
Li

(10) Patent No.: US 12,626,323 B2
(45) Date of Patent: May 12, 2026

(54) CONTROL METHOD AND DEVICE FOR IMAGE SIGNAL PROCESSORS OF MULTIPLE CHANNELS

(71) Applicants:VERISILICON MICROELECTRONICS (SHANGHAI) CO., LTD., Shanghai (CN); VERISILICON MICROELECTRONICS (CHENGDU) CO., LTD., Chengdu (CN); VERISILICON MICROELECTRONICS (NANJING) CO., LTD., Nanjing (CN); VERISILICON MICROELECTRONICS (BEIJING) CO., LTD., Beijing (CN)

(72) Inventor: Zhao Li, Chengdu (CN)

(73) Assignees: VERISILICON MICROELECTRONICS (SHANGHAI) CO., LTD., Shanghai (CN); VERISILICON MICROELECTRONICS (CHENGDU) CP., LTD., Chengdu (CN); VERISILICON MICROELECTRONICS (NANJING) CO., LTD., Nanjing (CN); VERISILICON MICROELECTRONICS (BEIJING) CO., LTD., Beijing (CN)

( * ) Notice: Subject to any disclaimer, the term of this patent is extended or adjusted under 35 U.S.C. 154(b) by 333 days.

(21) Appl. No.: 18/360,477

(22) Filed: Jul. 27, 2023

(65) Prior Publication Data

US 2024/0046404 A1 Feb. 8, 2024

(30) Foreign Application Priority Data

Aug. 8, 2022 (CN) .......................... 202210945875.3

(51) Int. Cl.
*G06T 1/20* (2006.01)

(52) U.S. Cl.
CPC ..................................... *G06T 1/20* (2013.01)

(58) Field of Classification Search
None
See application file for complete search history.

(56) References Cited

U.S. PATENT DOCUMENTS

2008/0165375 A1* 7/2008 Murakata ................. H04N 1/46
358/1.9
2012/0144172 A1* 6/2012 de Cesare ............... G06F 13/24
712/244

(Continued)

FOREIGN PATENT DOCUMENTS

JP 2004054669 * 2/2004 ............. G06F 13/24
WO WO 2022116755 * 6/2022 .......... G06F 11/0757

*Primary Examiner* — Beniyam Menberu

(74) *Attorney, Agent, or Firm* — BCF LLP

(57) ABSTRACT

Provided are control method and device for image signal processors of multiple channels, the method is applied to acceleration processing unit. The acceleration processing unit is connected with image signal processors of multiple channels, and the method includes: setting parameters of the image signal processors of multiple channels, and starting the image signal processors of multiple channels; starting timing when receiving interruption information reported by image signal processor of first channel; judging whether interruption information of image signal processor of each channel is received within preset time period from the starting of the timing, wherein if the interruption information of the image signal processor of each channel is not received within the preset time period, the image signal processor that does not send the interruption information is determined as target image signal processor; and re-setting parameters of the target image signal processor, and re-starting the target image signal processor.

10 Claims, 3 Drawing Sheets

(56)　　　　　　References Cited

U.S. PATENT DOCUMENTS

2015/0058507 A1*　2/2015　Sengoku ................. G06F 13/22
　　　　　　　　　　　　　　　　　　　　710/110
2018/0107618 A1*　4/2018　Hosseinipour ...... G06F 11/0787

* cited by examiner

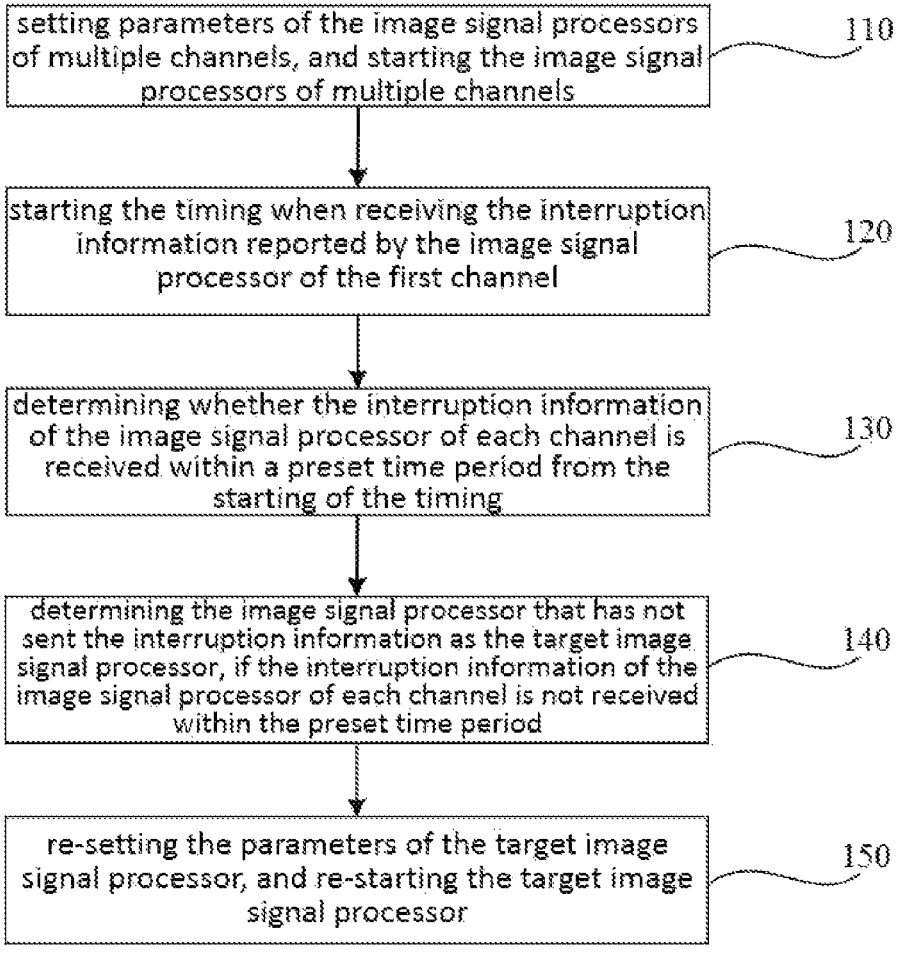

setting parameters of the image signal processors of multiple channels, and starting the image signal processors of multiple channels — 110 starting the timing when receiving the interruption information reported by the image signal processor of the first channel — 120 determining whether the interruption information of the image signal processor of each channel is received within a preset time period from the starting of the timing — 130 determining the image signal processor that has not sent the interruption information as the target image signal processor, if the interruption information of the image signal processor of each channel is not received within the preset time period — 140 re-setting the parameters of the target image signal processor, and re-starting the target image signal processor — 150

FIG. 1

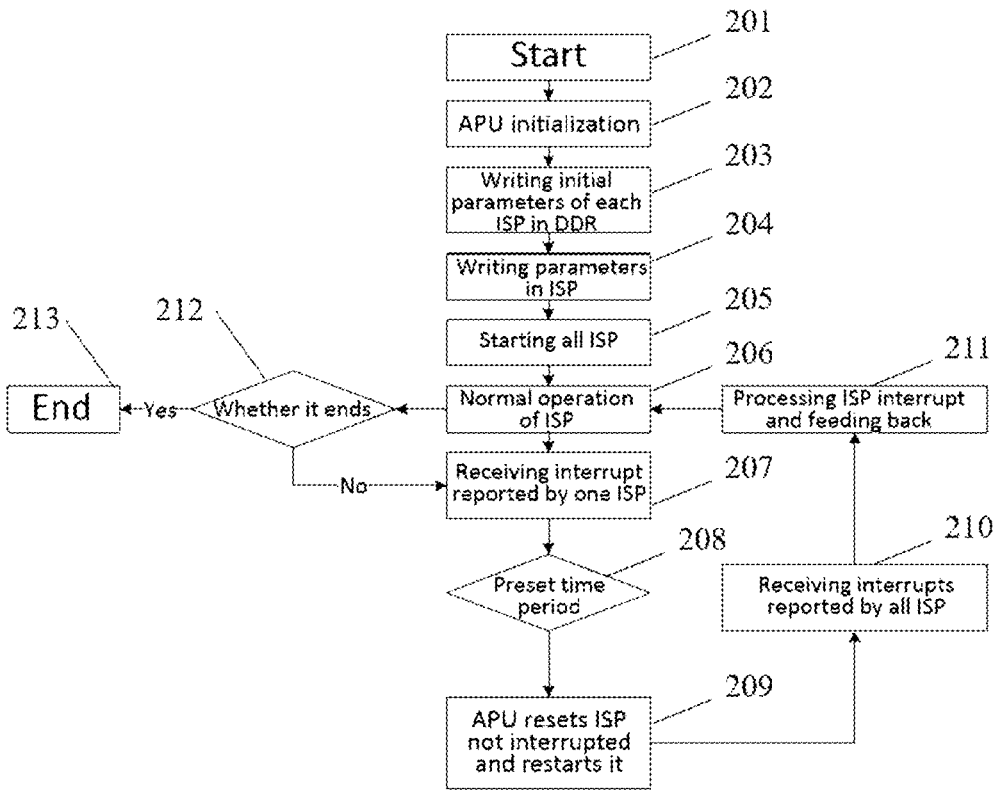

201 Start

202 APU initialization

203 Writing initial parameters of each ISP in DDR

204 Writing parameters in ISP

205 Starting all ISP

206 Normal operation of ISP

211 Processing ISP interrupt and feeding back

212 Whether it ends

213 End

Yes

No

207 Receiving interrupt reported by one ISP

208 Preset time period

210 Receiving interrupts reported by all ISP

209 APU resets ISP not interrupted and restarts it

FIG. 2

305 Image Signal Processor

304 DMA module

301 Acceleration Processing Unit

302 First bus

303 Second bus

FIG. 3

CONTROL METHOD AND DEVICE FOR IMAGE SIGNAL PROCESSORS OF MULTIPLE CHANNELS

CROSS-REFERENCE TO RELATED APPLICATION

The present disclosure claims the priority to Chinese patent application with the filing number 202210945875.3 filed on Aug. 8, 2022 with the Chinese Patent Office, the contents of which are incorporated herein by reference in entirety.

TECHNICAL FIELD

The present application relates to the technical field of signal processing, and in particular, to a control method and device for image signal processors of multiple channels.

BACKGROUND ART

An image signal processor, which is a key component of a digital camera, converts the signal of a sensor into an image signal. In a digital camera, image signal processors of multiple channels are usually provided to process the image signals of the corresponding channels respectively. When the image signal processors process signals, it is necessary to load the image signal processors of multiple channels onto the acceleration processing unit. At this time, the acceleration processing unit performs the interrupt synchronization based on the interrupt information reported by the image signal processor.

Currently, when performing the interrupt synchronization, the acceleration processing unit needs to process the interrupt event only after all the interrupts of the image signal processors have been reported. If there is a crash image signal processor, that is, an image signal processor that cannot perform the interrupt reporting, the acceleration processing unit will wait all the time, causing other image signal processors to crash.

Therefore, the existing control method for the image signal processors easily leads to the collapse of the image signal processor, and the control stability is poor.

SUMMARY

The purpose of the embodiments of the present application is to provide a control method and device for image signal processors of multiple channels, so as to improve the control stability of the image signal processors of multiple channels.

In a first aspect, an embodiment of the present application provides a control method for image signal processors of multiple channels, which is applied to an acceleration processing unit (APU), the acceleration processing unit is connected with the image signal processors (ISP) of multiple channels, the method comprises steps of: setting parameters of the image signal processors of multiple channels, and starting the image signal processors of multiple channels; starting timing when receiving an interruption information reported by an image signal processor of a first channel; judging whether interruption information of an image signal processor of each channel is received within a preset time period from the starting of the timing, wherein if the interruption information of the image signal processor of any one channel is not received within the preset time period, the image signal processor that does not send the interruption information is determined as a target image signal processor; and re-setting parameters of the target image signal processor, and re-starting the target image signal processor.

In the embodiment of the present application, instead of waiting for the image signal processor of each channel to report the interruption information, a preset time period is provided, wherein for a certain image signal processor, if no interruption information is reported within the preset time period, it is indicated that this image signal processor of this channel may be a crash image signal processor, so that the image signal processor of this channel is directly restarted, which avoids that the image signal processor of this channel affects the processing on the interruption events of other image signal processors. Further, the collapse of other image signal processors is avoided, and thus the control stability is improved.

As a possible implementation manner, the step of starting timing when receiving interruption information reported by an image signal processor of a first channel comprises: starting the timing through a preset timing thread, when receiving the interruption information reported by the image signal processor of the first channel.

In the embodiment of the present application, the timing can be realized through a preset timing thread, so as to improve the accuracy and stability of the timing, thereby realizing determining accurately whether there is a target image signal processor.

As a possible implementation manner, after the re-starting of the target image signal processor, the method further comprises: processing an interrupt event of the image signal processor of each channel, according to the interrupt information of the target image signal processor after being restarted and the image signal processors of other channels, if receiving interrupt information of the target image signal processor after being restarted and the image signal processors of other channels within a preset time period.

In the embodiment of the present application, after the target image signal processor is restarted, the acceleration processing unit receives the interruption information of the image signal processor of each channel, so as to process the interruption event of the image signal processor of each channel. The image signal processor of each channel includes a target image signal processor and other image signal processors.

As a possible implementation manner, the method further comprises: processing the interrupt event of an image signal processor of each channel, according to the interrupt information of an image signal processor of each channel, if receiving interrupt information of an image signal processor of each channel within a preset time period.

In the embodiment of the present application, the acceleration processing unit receives the interruption information of the image signal processor of each channel within a preset time period, which means that the image signal processor of each channel has reported the interruption information, and there is no crush image signal processor, and the interrupt event of the image signal processor of each channel is processed.

As a possible implementation manner, the step of re-setting parameters of the target image signal processor comprises: reading from a memory a pre-stored setting parameters, and re-setting the parameters of the target image signal processor based on the pre-stored setting parameters.

In the embodiment of the present application, when the target image signal processor is restarted, the setting of parameters is performed through the setting parameters pre-stored in the memory, so as to improve the efficiency of setting the parameters, reduce the control time for the image signal processor, and improve the control stability.

As a possible implementation manner, the pre-stored setting parameters are initial parameters of any one of multiple channels of the image signal processors, and the initial parameters are common parameters of the image signal processors of multiple channels.

In the embodiment of the present application, the common parameters of the image signal processors of multiple channels are stored in the memory, and then, when reading the parameters, it is enough to read only the parameters of the image signal processor of any one channel, which improves efficiency of reading and storing the parameters.

As a possible implementation manner, the acceleration processing unit comprises a first bus and a second bus, the first bus has a data reading-writing speed lower than that of the second bus, A DMA (Direct Memory Access) module is provided between the first bus and the image signal processors of multiple channels, and the first bus reads and writes data from/to a corresponding image signal processor through the DMA module.

In the embodiment of the present application, the acceleration processing unit is provided with two buses for reading and writing data. For one bus with lower data reading-writing speed, the DMA module is used to realize the reading and writing of data, which can improve the efficiency of reading and writing the data, and further ensure the overall efficiency of reading and writing the data.

In a second aspect, an embodiment of the present application provides a control device for image signal processors of multiple channels, including: individual functional modules for implementing the control method for image signal processors of multiple channels in the first aspect and in any possible implementation manner of the first aspect.

In a third aspect, an embodiment of the present application provides an electronic device, including: a processor; and a memory communicatively connected to the processor, wherein the memory stores instructions executable by the processor, and the instructions are executed by the processor to enable the processor to execute the control method for image signal processors of multiple channels in the first aspect and in any possible implementation manner of the first aspect.

In a fourth aspect, an embodiment of the present application provides computer-readable storage medium, with a computer program being stored on the computer-readable storage medium, wherein when the computer program is run by a computer, the control method for image signal processors of multiple channels in the first aspect and in any possible implementation manner of the first aspect is executed.

BRIEF DESCRIPTION OF DRAWINGS

In order to explain the technical solutions of the embodiments of the present application more clearly, the drawings that need to be used in the embodiments of the present application will be briefly introduced below. It should be understood that the following drawings only show some of the embodiments of the present application, and therefore should not be regarded as a limitation on the scope. For those skilled in the art, other related drawings can also be obtained from these drawings without any creative efforts.

FIG. 1 is a flowchart of control method for image signal processors of multiple channels provided by an embodiment of the present application;

FIG. 2 is a flowchart of the control for an image signal processor provided by an embodiment of the present application;

FIG. 3 is a schematic diagram of data reading and writing provided by an embodiment of the present application;

Figure 4:
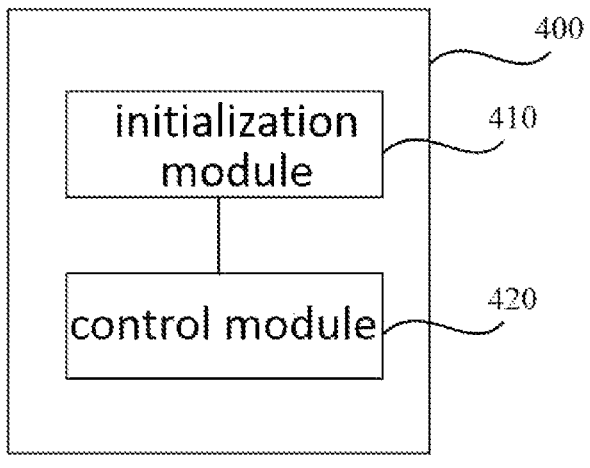
FIG. 4 is a schematic structural diagram of a control device for image signal processors of multiple channels provided by an embodiment of the present application.

Reference signs: 301—Acceleration Processing Unit; 302—First bus; 303—Second bus; 304—DMA module; 305—Image Signal Processor; 400—control device for the image signal processors of multiple channels; 410—initialization module; 420—control module; 500—electronic equipment; 510—processor; 520—memory.

DETAILED DESCRIPTION OF EMBODIMENTS

The technical solutions in the embodiments of the present application will be described below with reference to the drawings in the embodiments of the present application.

The technical solutions provided by the embodiments of the present application can be applied to various application scenarios involving the control for the image signal processor, for example, the control of the image signal processor in a digital camera. The image signal processor can convert the signal of the sensor into an image that can be received. For the image signal processor, it is necessary to load image signal processors of multiple channels onto one acceleration processing unit, that is, one acceleration processing unit controls the image signal processors of multiple channels. In the present application scenario, since one acceleration processing unit needs to control the image signal processors of multiple channels, it is necessary to ensure the stability of the control, for avoiding the collapse of the system.

Based on the introduction of the above application scenarios, referring to FIG. 1 next, it is a flowchart of a control method for image signal processors of multiple channels provided by an embodiment of the present application. The control method includes following steps.

Step 110: setting parameters of the image signal processors of multiple channels, and starting the image signal processors of multiple channels.

Here, the parameters of the image signal processors of multiple channels include common parameters and parameters specific to the individual image signal processors.

Regardless of whether it is common parameters or parameters for the individual image signal processors, in Step 110, the setting parameters are all read from an external file, so that the parameters of the image signal processors of multiple channels are set based on the read setting parameters.

Here, for the common parameters, as an optional implementation manner, the common parameters of the image signal processor of any one channel are stored in the memory as pre-stored setting parameters, which can be applied in subsequent processes.

In some embodiments, the above-mentioned memory may be DDR (Double Data Rate), or other memories, which is not limited herein.

During setting parameters, the setting parameters corresponding to the image signal processor of each channel are written into the registers in the image signal processor to complete the setting.

After the parameter setting is completed, the image signal processors of multiple channels can be started, and the image signal processors of multiple channels will start the signal processing correspondingly.

In some embodiments, before Step 110, the acceleration processing unit is also needed to be initialized before the acceleration processing unit can start to execute Step 110.

Step 120: starting the timing when receiving the interruption information reported by the image signal processor of the first channel.

Step 130: determining whether the interruption information of the image signal processor of each channel is received within a preset time period from the starting of the timing.

Step 140: determining the image signal processor that has not sent the interruption information as the target image signal processor, if the interruption information of the image signal processor of each channel is not received within the preset time period.

Here, the target image signal processor is the image signal processor that does not report interruption information within a preset time period.

It can be understood that after starting an image signal processor of each channel, if the image signal processor of each channel is running normally, the interrupt information will be reported correspondingly; and however, if the image signal processor of any channel is crush, the interrupt information will not be reported.

In a normal process, the acceleration processing unit generally waits for all the image signal processors to report the interrupt information, and then the interrupt event is just processed, which will cause that the interrupt event is unable to be effectively processed, thereby causing the system to crash.

Therefore, in this embodiment of the present application, after starting the image signal processors of multiple channels, while receiving the interruption information reported by the image signal processors of individual channels, it is monitored whether there is any image signal processor that does not report the interruption information within a preset time period, wherein if yes, it needs to be processed.

In this embodiment of the present application, the preset time period can be understood as the longest allowable reporting time of interruption information. Different settings can be performed in different application scenarios, and the value of the specific time period is not limited here.

When the image signal processor of the first channel reports the interruption information, the timing can be started, so as to be compared with the preset time period, wherein the image signal processor of the first channel is understood as the image signal processor that reports firstly the interruption information, which may be the image signal processor of any channel. For image signal processors of multiple channels, there is no distinction in terms of order.

Furthermore, after the timing is started, the judgment can be made according to the real-time timing information and the preset time period. For example, if the preset time period is 1 hour and the current timing information is 50 minutes, it can be detected whether the image signal processor of each channel reports the interruption information. If there is an image signal processor that does not report interruption information, the timing is continued until the timer reaches 1 hour. If there is still an image signal processor that does not report interruption information, the image signal processor is the target image signal processor.

In some embodiments, if the real-time timing information has not reached the preset time period, but all the image signal processors have reported the interruption information, the real-time timing information can be cleared to 0 at this time, and the reporting of the interruption information of the new image signal processor can be monitored.

In the embodiment of the present application, when the interruption information reported by the image signal processor of first channel is received, the timing is started, and it is determined whether the interruption information of the image signal processor of each channel is received within the preset time period from the starting of the timing, wherein if the interruption information of the image signal processor of any one channel is not received within the preset time period, the image signal processor that has not sent the interruption information is determined as the target image signal processor, so as to realize the effective judgment of whether there is a target image signal processor.

As an optional implementation manner, when receiving the interruption information reported by the image signal processor of the first channel, the timing is started, which includes that: when receiving the interruption information reported by the image signal processor of the first channel, the timing is started through the preset timing thread.

In this embodiment, the timing is implemented through a timing thread. In some embodiments, the timing thread can be started after the image signal processors of individual channels are started. In other embodiments, the timing thread may also be started after the acceleration processing unit is initialized. When the conditions to start timing are met, the timing thread starts timing.

In the embodiment of the present application, the timing can be realized through a preset timing thread, so as to improve the accuracy and stability of the timing, thereby realizing accurate determination of whether there is a target image signal processor.

Step 150: re-setting the parameters of the target image signal processor, and re-starting the target image signal processor.

If the judgment result is that the interruption information of the image signal processor of any one channel is not received within the preset time period, the image signal processor that has not sent the interruption information is determined as the target image signal processor, and the target image signal processor is then processed.

During the processing, first, the parameters of the target image signal processor are re-set, and then it is restarted.

With reference to the introduction of the foregoing embodiments, the image signal processor of each channel includes common parameters and non-common parameters, and the common parameters can be pre-stored in the memory.

Therefore, as an optional implementation manner, the step of re-setting the parameters of the target image signal processor includes: reading pre-stored setting parameters from the memory, and re-setting the parameters of the target image signal processor based on the pre-stored setting parameters.

In this embodiment, the common parameters can be directly read from the memory, and then the parameters of this part can be set.

For the non-common parameters of another part, they are still read from external files and set.

In the embodiment of the present application, when the target image signal processor is restarted, the parameter setting is performed through the setting parameters pre-stored in the memory, so as to improve the efficiency of setting parameters, reduce the control time for the image signal processor, and improve the control stability.

In some embodiments, the pre-stored setting parameters are initial parameters of the image signal processor of any one of the multiple channels of image signal processors, and the initial parameters are parameters common to the image signal processors of multiple channels.

In the embodiment of the present application, the common parameters of the image signal processors of multiple channels are stored in the memory. Then, when reading the parameters, only the parameters of the image signal processor of any one channel need to be read, which improves efficiency of reading and storing the parameters.

Further, after re-starting the target image signal processor in Step 150, the control method for the image signal processors of multiple channels provided by the embodiment of the present application further includes:

processing the interrupt event of the image signal processor of each channel, according to the interrupt information of the target image signal processor after being restarted and the image signal processors of other channels, if the interrupt information of the target image signal processor after being restarted and the image signal processors of other channels is received within a preset time period.

In the embodiment of the present application, if the acceleration processing unit receives the interrupt information sent by the target image signal processor after being restarted and other image signal processors to the acceleration processing unit within the preset time period, since the interruption information of the image signal processors of individual channels are received, the interruption event of the image signal processor of each channel is processed.

In addition, the control method for the image signal processors of multiple channels provided by the embodiment of the present application further includes:

processing the interruption event of the image signal processor of each channel according to the interruption information of the image signal processor of each channel, if the interruption information of the image signal processor of each channel is received within the preset time period.

In the embodiment of the present application, if the interruption information of an image signal processor of each channel is received within the preset time period, it means that there is no target image signal processor in the image signal processors of multiple channels, and the image signal processor of each channel reports the interruption information within the preset time period, therefore, the interruption event of the image signal processor of each channel is directly processed.

For easy understanding, referring to FIG. 2, it is a complete flowchart of the control method provided by the embodiment of the present application. As shown in FIG. 2, below Start 201, the acceleration processing unit (shown as APU in FIG. 2) is initialized first, i.e. APU initialization 202, and then the initial parameters (common parameters) of the image signal processor of each channel (shown as ISP in FIG. 2) are written into DDR, i.e. Writing initial parameters of each ISP in DDR 203, and the parameters (including common parameters and non-common parameters) are written into the image signal processor, i.e. Writing parameters in ISP 204. Then, all the image signal processors are started, i.e. Starting all ISP 205, and the image signal processors operate normally, i.e. Normal operation of ISP 206.

During the operation of the image signal processors, if an interrupt is received from the image signal processor of one channel, i.e. Receiving interrupt reported by one ISP 207, the timing is started, i.e. Preset time period 208. For the image signal processor that does not report the interruption within a preset time period, the parameters are set based on parameters stored in the DDR, and the restart is performed, i.e. APU resets ISP not interrupted and restarts it 209, until the acceleration processing unit receives the interruptions reported by the image signal processors of individual channels, i.e. Receiving interrupts reported by all ISP 210, processes the interruptions and feeds back, i.e. Processing ISP interrupt and feeding back 211. After Normal operation of ISP 206, there is a step to determine Whether it ends 212, if no, go to the step 207, if yes, go to End 213.

As mentioned in the above embodiments, the setting of the image signal processor needs to read and write data, and for example, data is written into a register.

In the acceleration processing unit, the reading and writing of data is performed through the bus. As an optional implementation manner, referring to FIG. 3, it is a schematic diagram of reading and writing the data, provided in this embodiment of the application. The acceleration processing unit 301 includes a first bus 302 and a second bus 303, and the data reading-writing speed of the first bus is lower than that of the second bus. A DMA module 304 is provided between the first bus and the image signal processors 305 of multiple channels, and the first bus reads and writes data from/to the corresponding image signal processor through the DMA module.

In some embodiments, the first bus may be an AXI (Advanced eXtensible Interface) bus, and the second bus may be an AHB (Advanced High Performance Bus).

In this embodiment, in terms of software, the master-slave control mode of AHB can be changed to the DMA control mode of AXI, so that the data reading and writing operations of the register may be performed for the image signal processor through the AXI bus and DMA.

That is, after the DMA module is added, the DMA module is responsible for the data reading and writing operations of the first bus and the second bus. For this reading and writing operations, the reading and writing control is achieved by the DMA module, instead of the acceleration processing unit, which can increase the data reading and writing efficiency.

In the embodiment of the present application, the acceleration processing unit is provided with two buses for reading and writing data. For one bus with slower data reading and writing speed, the reading and writing of data is realized by the DMA module, which can improve the data reading and writing efficiency thereof, and further ensure the overall data reading and writing efficiency.

In different application scenarios, the first bus and the second bus may also be implemented in other manners, which are not limited herein.

Through the introduction of the embodiments of the present application, it can be seen that in the control method for the image signal processor adopted in the embodiments of the present application, the mode of one-way thread servo is used to perform the timing during the interrupt synchronization process, and the image signal processor that does not report the interrupt is restarted after timeout. The image signal processor in the normal operation is not affected, which has a good isolation effect and enhances the stability of the control for the image signal processor.

The image signal processor, which does not report, is restarted through one thread, and the parameters of the image signal processor are set, directly from the memory, and the dead image signal processor is quickly restarted, which enhances the stability of the control for the image signal processor.

The mode of one bus controlling the image signal processor is changed. The register of the image signal processor is written in the mode of combining two buses and DMA module, which reduces the control time for writing the register doubly.

Based on the same inventive concept, referring to FIG. 4, an embodiment of the present application further provides a control device 400 for image signal processors of multiple channels, including an initialization module 410 and a control module 420.

The initialization module 410 is configured to set the parameters of the image signal processors of multiple channels and start the image signal processors of multiple channels. The control module 420 is configured in the way that when receiving the interruption information reported by the image signal processor of the first channel, timing is started; and it is determined whether the interruption information of the image signal processor of each channel is received within the preset time period from the starting of the timing, wherein if the interruption information of the image signal processor of any one channel is not received within the preset time period, the image signal processor that does not send the interrupt information is determined as the target image signal processor, the parameters of the target image signal processor are re-set, and the target image signal processor is restarted.

In this embodiment of the present application, the control module 420 is further configured to start the timing through a preset timing thread, when receiving the interruption information reported by the image signal processor of the first channel.

In this embodiment of the present application, the control module 420 is further configured to process the interrupt event of the image signal processor of each channel, according to the interrupt information of the target image signal processor after being restarted and other image signal processors, if receiving the interruption information of the target image signal processor after being restarted and other image signal processors within a preset time period.

In this embodiment of the present application, the control module 420 is further configured to process the interrupt event of the image signal processor of each channel, according to the interruption information of the image signal processor of each channel, if receiving the interruption information of the image signal processor of each channel within a preset time period.

In this embodiment of the present application, the control module 420 is further configured to read pre-stored setting parameters from the memory, and reset the parameters of the target signal processor based on the pre-stored setting parameters.

In the embodiment of the present application, the pre-stored setting parameters are initial parameters of any one of the multiple channels of the signal processors, and the initial parameters are parameters common to the signal processors of the multiple channels.

In the embodiment of the present application, the acceleration processing unit includes a first bus and a second bus. The data reading-writing speed of the first bus is lower than that of the second bus. A DMA module is provided between the first bus and the image signal processors of multiple channels. The first bus reads and writes data from/to the corresponding image signal processor through the DMA module.

The control device 400 for the image signal processors of multiple channels corresponds to the aforementioned control method for the image signal processors of multiple channels. The individual functional modules correspond to the individual steps of the aforementioned control method. Thus, the implementation manner of the individual functional modules is obtained by referring to the implementation manner of the control method in the foregoing embodiments, which is not repeated here.

Figure 5:
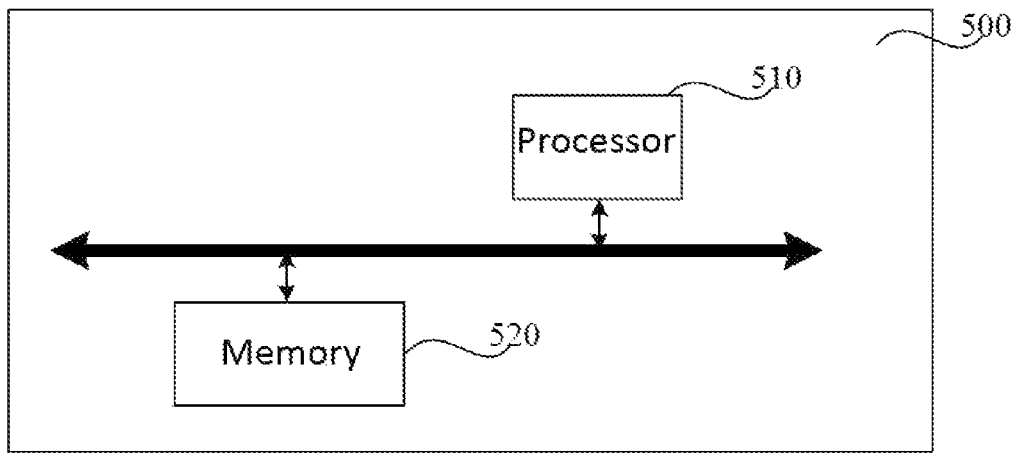
FIG. 5 is a schematic structural diagram of an electronic device provided by an embodiment of the present application.

Referring to FIG. 5, an embodiment of the present application further provides an electronic device 500, which can be used as an execution body for the aforementioned control method for image signal processors of multiple channels, including: a processor 510 and a storage device 520 communicatively connected to the processor 510.

Here, the storage device 520 stores instructions that can be executed by the processor 510. The instructions are executed by the processor 510, so that the processor 510 can execute the control method for the image signal processors of multiple channels in the aforementioned embodiments.

The processor 510 and the storage device 520 may be connected with each other by a communication bus, or connected through some communication modules, such as: a wireless communication module, a Bluetooth communication module, a Wi-Fi (wireless network communication technology) communication module, a 2G (second generation mobile communication technology), 3G (third generation mobile communication technology), 4G (fourth generation mobile communication technology) and 5G communication modules, etc.

The processor 510 may be an integrated circuit chip with signal processing capability. The processor 510 may be a general-purpose processor, including a CPU (Central Processing Unit), NP (Network Processor), etc.; it may also be a digital signal processor, an application-specific integrated circuit, a field programmable gate array or other programmable logic devices, discrete gate or transistor logic devices, discrete hardware components. It can implement or execute the individual methods, steps, and logical block diagrams disclosed in the embodiments of the present application. A general purpose processor may be a microprocessor, and alternatively the processor may be any conventional processor or the like.

The storage device 520 may include, but is not limited to, RAM (Random Access Memory), ROM (Read Only Memory), PROM (Programmable Read-Only Memory), EPROM (Erasable Programmable Read-Only Memory), EEPROM (Electric Erasable Programmable Read-Only Memory), etc.

It can be understood that the electronic device 500 may further include more general modules required by itself, which will not be introduced one by one in this embodiment of the present application.

The embodiment of the present application also provides a computer-readable medium, on which a computer program is stored. When the computer program is run by a computer, the control method for image signal processors of the multiple channels described in the aforementioned embodiment is executed.

In the embodiments provided in the present application, it should be understood that the device and method disclosed may be implemented in other manners. The device embodiments described above are only illustrative. For example, the division of the units is only a logical function division. In actual implementation, there may be other division methods. Again, for example, plural units or components may be combined or integrated into another system, or some features can be ignored, or not implemented. On the other hand, the shown or discussed mutual coupling or direct coupling or communication connection may be achieved through indirect coupling or communication connection of some communication interfaces, devices or units, which may be in electrical, mechanical or other forms.

In addition, units described as separate components may or may not be physically separated. A component shown as a unit may or may not be a physical unit, that is, may be located in one place, or may be distributed to plural network units. Some or all of the units may be selected according to actual needs, to achieve the purpose of the technical solutions in this embodiment.

Furthermore, individual functional modules in each embodiment of the present application may be integrated together to form an independent part, or each module may exist alone, or two or more modules may be integrated to form an independent part.

Here, relational terms, such as, first and second, etc., are used only to distinguish one entity or operation from another entity or operation, and do not necessarily require or imply any such actual relationship or sequence between these entities or operations.

Only embodiments of the present application are described above, and not intended to limit the protection scope of the present application. For those skilled in the art, various modifications and changes may be made to the present application. Any modifications, equivalent replacements, improvements, etc. made within the spirit and principle of the present application shall be included within the protection scope of the present application.

What is claimed is:

1. A control method for image signal processors of multiple channels, applicable to an acceleration processing unit, wherein the acceleration processing unit is connected with image signal processors of multiple channels, and the method comprises steps of:

setting parameters of the image signal processors of multiple channels, and starting the image signal processors of multiple channels;

starting timing when receiving an interruption information reported by an image signal processor of a first channel;

judging whether interruption information of an image signal processor of each channel is received within a preset time period from the starting of the timing, wherein if the interruption information of the image signal processor of each channel is not received within the preset time period, an image signal processor that does not send the interruption information is determined as a target image signal processor; and re-setting parameters of the target image signal processor, and re-starting the target image signal processor.

2. The control method of image signal processors of multiple channels according to claim 1, wherein the step of starting timing when receiving interruption information reported by an image signal processor of a first channel comprises:

starting the timing through a preset timing thread, when receiving the interruption information reported by the image signal processor of the first channel.

3. The control method of image signal processors of multiple channels according to claim 2, wherein after the re-starting of the target image signal processor, the method further comprises:

processing an interrupt event of the image signal processor of each channel, according to interrupt information of the target image signal processor after being restarted and image signal processors of other channels, if receiving the interrupt information of the target image signal processor after being restarted and the image signal processors of other channels within a preset time period.

4. The control method of image signal processors of multiple channels according to claim 1, wherein after the re-starting of the target image signal processor, the method further comprises:

processing an interrupt event of the image signal processor of each channel, according to interrupt information of the target image signal processor after being restarted and image signal processors of other channels, if receiving the interrupt information of the target image signal processor after being restarted and the image signal processors of other channels within a preset time period.

5. The control method of image signal processors of multiple channels according to claim 1, wherein the method further comprises:

processing an interrupt event of the image signal processor of each channel, according to interrupt information of the image signal processor of each channel, if receiving the interrupt information of the image signal processor of each channel within a preset time period.

6. The control method for image signal processors of multiple channels according to claim 1, wherein the step of re-setting parameters of the target image signal processor comprises:

reading from a memory a pre-stored setting parameters, and re-setting the parameters of the target image signal processor based on the pre-stored setting parameters.

7. The control method for image signal processors of multiple channels according to claim 6, wherein the pre-stored setting parameters are initial parameters of any one of multiple channels of the image signal processors, and the initial parameters are common parameters of the image signal processors of multiple channels.

8. The control method of image signal processors of multiple channels according to claim 1, wherein the acceleration processing unit comprises a first bus and a second bus, the first bus has a data reading-writing speed lower than that of the second bus, A DMA module is provided between the first bus and the image signal processors of multiple channels, and the first bus reads and writes data from/to a corresponding image signal processor through the DMA module.

9. An electronic device, comprising:

a processor; and a memory communicatively connected to the processor, wherein the memory stores instructions executable by the processor, and the instructions are executed by the processor to enable the processor to execute the control method of image signal processors of multiple channels according to claim 1.

10. A control device for image signal processors of multiple channels, which is arranged in an acceleration processing unit, wherein the acceleration processing unit is connected to the image signal processors of multiple channels, and the device comprises:

an initialization module, configured to set parameters of the image signal processors of multiple channels, and start the image signal processors of multiple channels;

a control module, configured for: starting timing when receiving an interruption information reported by an image signal processor of a first channel; judging whether interruption information of an image signal processor of each channel is received within a preset time period from the starting of the timing, wherein if the interruption information of the image signal processor of each channel is not received within the preset time period, the image signal processor that does not send the interruption information is determined as a target image signal processor; and re-setting parameters of the target image signal processor, and re-starting the target image signal processor.

* * * * *